(12) United States Patent
Seymour et al.

(10) Patent No.: US 11,432,554 B2
(45) Date of Patent: Sep. 6, 2022

(54) PANCAKE TEMPLATE AND RELATED PANCAKE COOKING METHOD

(71) Applicant: National Presto Industries, Inc., Eau Claire, WI (US)

(72) Inventors: Justun C. Seymour, Eau Claire, WI (US); Jesse Kukuk, Chippewa Falls, WI (US); Michael R. Berge, Eau Claire, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 1019 days.

(21) Appl. No.: 16/054,479

(22) Filed: Aug. 3, 2018

(65) Prior Publication Data
US 2020/0037617 A1 Feb. 6, 2020

(51) Int. Cl.
*A21B 3/13* (2006.01)
*A47J 37/06* (2006.01)
*A21D 13/44* (2017.01)

(52) U.S. Cl.
CPC .............. *A21B 3/138* (2013.01); *A21D 13/44* (2017.01); *A47J 37/067* (2013.01)

(58) Field of Classification Search
CPC .......... A21B 3/138; A21B 5/03; A21D 13/44; A21D 13/41; A21D 8/06; A21D 13/47; A47J 37/067; A47J 36/04; A47J 37/0676; A47J 43/20; A47J 37/0611; A47J 37/108; A47J 27/002; A21C 11/08; A21C 14/00; B29C 67/0011; A23L 5/10; A23V 2002/00
USPC ................... 99/388, 422–428, 430–433, 439, 99/440–442; 222/154
See application file for complete search history.

(56) References Cited

U.S. PATENT DOCUMENTS

| 345,530 | A | 7/1886 | Paris |
| 1,478,801 | A | 12/1923 | Slye |
| 1,925,700 | A | 9/1933 | Matter |
| 2,274,285 | A | 2/1942 | Walker |
| D139,751 | S | 12/1944 | Springwell |

(Continued)

FOREIGN PATENT DOCUMENTS

| FR | 2973679 A1 | * | 10/2012 | ............ A47J 37/067 |
| FR | 2984464 A1 | * | 6/2013 | ............ A21B 3/138 |

OTHER PUBLICATIONS

Presto® 20-inch Cool Touch Electric Griddle, webpage, http://www.gopresto.com/products/products.php?stock=07030, Nov. 7, 2011, 2 pages.

(Continued)

*Primary Examiner* — Tu B Hoang
*Assistant Examiner* — Diallo I Duniver

(57) ABSTRACT

A batter template system and related methods of forming custom pancakes. The batter template system can include one or more template mats made from flexible, non-stick materials that are suitable for use with food and can accommodate conventional cooking temperatures. The template mat can have thermal properties allowing for rapid heating and can be non-perforated. Each template mat can include a permanently etched design on one or both sides of a non-stick sheet. The template mat can be sized and shaped to fit onto a cooking surface of a countertop griddle, cooking pan or even range top surface. One or more pancake batters can be traced or otherwise applied to the etched design to form a pancake depicting a visual design element.

18 Claims, 6 Drawing Sheets

(56) References Cited

U.S. PATENT DOCUMENTS

| | | | |
|---|---|---|---|
| 2,547,982 A | 4/1951 | Sivley | |
| 2,791,960 A | 5/1957 | De Pietropinto | |
| D187,835 S | 5/1960 | Lee | |
| 3,060,494 A | 10/1962 | Noble | |
| D229,448 S | 11/1973 | Traclet | |
| 3,780,978 A | 12/1973 | Proul | |
| 4,156,516 A | 5/1979 | Oliver | |
| D281,215 S | 11/1985 | Lastuck | |
| D285,523 S | 9/1986 | Ayukawa et al. | |
| D286,494 S | 11/1986 | Lastuck | |
| 4,656,927 A | 4/1987 | Mosby | |
| D289,847 S | 5/1987 | Okamoto | |
| D296,509 S | 7/1988 | Fuke | |
| 5,062,356 A | 11/1991 | Frankowski | |
| 5,131,320 A | 7/1992 | Jensen | |
| D335,240 S | 5/1993 | Critchfield et al. | |
| 5,400,698 A | 3/1995 | Savage | |
| 5,414,956 A | 5/1995 | Kheradpir | |
| 5,453,287 A | 9/1995 | Close | |
| D366,390 S | 1/1996 | Vitantonio | |
| D375,868 S | 11/1996 | Larson | |
| 5,740,723 A | 4/1998 | Lin | |
| 5,752,432 A | 5/1998 | Burchfield | |
| D409,041 S | 5/1999 | Barker | |
| D411,787 S | 7/1999 | Cianci | |
| D412,808 S | 8/1999 | Hinton et al. | |
| D414,075 S | 9/1999 | Mishan | |
| 6,016,741 A | 1/2000 | Tsai et al. | |
| 6,064,042 A | 5/2000 | Glucksman et al. | |
| 6,065,393 A | 5/2000 | Lombard | |
| D431,152 S | 9/2000 | Lee | |
| D436,796 S | 1/2001 | Kalina et al. | |
| 6,186,055 B1 | 2/2001 | DeMars et al. | |
| D441,250 S | 5/2001 | Choi | |
| 6,472,644 B1 | 10/2002 | Wu | |
| D471,990 S | 3/2003 | Riccobene | |
| 6,627,239 B1 * | 9/2003 | Gavie | A21B 3/131 249/119 |
| D483,224 S | 12/2003 | Clark | |
| D484,737 S | 1/2004 | Bodum | |
| 6,813,994 B2 | 11/2004 | Williams | |
| D500,629 S | 1/2005 | Huggler | |
| D505,044 S | 5/2005 | Hei | |
| 6,990,893 B2 | 1/2006 | Cheng | |
| D514,876 S | 2/2006 | Simond | |
| 7,011,015 B1 | 3/2006 | Marghella | |
| D533,016 S | 12/2006 | Genslak et al. | |
| 7,227,104 B2 | 6/2007 | Ghislain | |
| 7,318,575 B2 | 1/2008 | Welch | |
| D564,826 S | 3/2008 | Chin | |
| D568,095 S | 5/2008 | De'Longhi | |
| D575,098 S | 8/2008 | Seymour | |
| 7,441,496 B2 | 10/2008 | Romano | |
| 7,523,697 B2 | 4/2009 | Hedrington | |
| D602,597 S | 10/2009 | Nomi | |
| D618,047 S | 6/2010 | Seymour | |
| D644,867 S | 9/2011 | Janvier | |
| 1,015,584 A1 | 1/2012 | Powell | |
| D654,327 S | 2/2012 | Mills | |
| D654,328 S | 2/2012 | Mills | |
| D654,331 S | 2/2012 | Mills | |
| D654,332 S | 2/2012 | Mills | |
| D658,429 S | 5/2012 | Berge | |
| D674,656 S | 1/2013 | Berge et al. | |
| 8,381,639 B2 | 2/2013 | Ewald | |
| D686,036 S | 7/2013 | Nelson | |
| D696,549 S | 12/2013 | Pennington | |
| 8,766,147 B2 * | 7/2014 | Reischmann | H05B 6/1209 219/622 |
| D710,148 S | 8/2014 | Mainville | |
| 9,095,005 B2 * | 7/2015 | Reischmann | H05B 6/1209 |
| 9,192,178 B2 | 11/2015 | Berge et al. | |
| D745,802 S | 12/2015 | Yao | |
| 9,211,029 B2 | 12/2015 | Lin | |
| D760,018 S | 6/2016 | Koszylko | |
| D793,801 S | 8/2017 | Bassill | |
| D801,624 S | 11/2017 | Zsolcsak | |
| D823,047 S | 7/2018 | Seymour | |
| D831,410 S | 10/2018 | Bassill | |
| D851,440 S | 6/2019 | Berge | |
| D852,573 S | 7/2019 | Bassill | |
| D856,742 S | 8/2019 | Mano | |
| D858,177 S | 9/2019 | Berge | |
| D859,061 S | 9/2019 | Hollinger | |
| D859,062 S | 9/2019 | Berge | |
| 2004/0227054 A1 | 11/2004 | Teh | |
| 2005/0045045 A1 | 3/2005 | Sullivan | |
| 2005/0072311 A1 * | 4/2005 | Szymanski | A21B 5/03 99/349 |
| 2005/0076791 A1 * | 4/2005 | Welch | A47J 43/20 99/332 |
| 2005/0095334 A1 | 5/2005 | Messina | |
| 2006/0163242 A1 | 7/2006 | Ciancimino et al. | |
| 2007/0029275 A1 * | 2/2007 | Hantman | B65D 81/3288 215/6 |
| 2008/0274243 A1 | 11/2008 | Fang | |
| 2009/0110790 A1 | 4/2009 | Riley | |
| 2010/0005975 A1 * | 1/2010 | Mitchell | A21C 11/02 99/382 |
| 2011/0311701 A1 | 12/2011 | Lewis | |
| 2012/0280106 A1 | 11/2012 | Mills | |
| 2014/0007780 A1 * | 1/2014 | Fast | A47J 37/0611 99/422 |
| 2014/0265001 A1 | 9/2014 | Palazzolo | |
| 2014/0272037 A1 | 9/2014 | Frenkil | |
| 2014/0360383 A1 | 12/2014 | Hamlin | |
| 2016/0309957 A1 | 10/2016 | Bart | |
| 2017/0265685 A1 * | 9/2017 | Daniels | A47J 43/20 |
| 2017/0265686 A1 * | 9/2017 | Terrell | A47J 43/20 |
| 2018/0116462 A1 * | 5/2018 | Berge | A47J 37/108 |
| 2018/0132661 A1 * | 5/2018 | Braden | A21B 3/132 |

OTHER PUBLICATIONS

Presto® 22-inch Electric Griddle, webpage, http://www.gopresto.com/products/products.php?stock=07039, Nov. 7, 2011, 2 pages.

Presto® 22-inch Electric Griddle with Removable Handles, webpage, http://www.gopresto.com/products/products.php?stock=07061, Nov. 7, 2011, 2 pages.

Presto® Cool Touch Electric Griddle, webpage, http://www.gopresto.com/products/products.php?stock=07047, Nov. 7, 2011, 2 pages.

Presto® Cool Touch Electric Foldaway™ Griddle, webpage, http://www.gopresto.com/products/products.php?stock=07050, Nov. 7, 2011, 2 pages.

Presto® Cool Touch Electric Tilt'nDrain™ Griddle, webpage, http://www.gopresto.com/products/products.php?stock=07045, Nov. 7, 2011, 2 pages.

Presto® Liddle Griddle® mini griddle, webpage, http://www.gopresto.com/products/products.php?stock=07211, Nov. 7, 2011, 2 pages.

Presto® Tilt'nDrain™ BigGriddle cool touch electric griddle, webpage, http://www.gopresto.com/products/products.php?stock=07046, Nov. 7, 2011, 3 pages.

APW Wyott 23780 7 Qt. Notched/Hinged Stainless Steel Inset Cover, webpage, http://www.webstaurantstore.com/apw-wyott-23780-7-qt-notched-hinged-stainless-steel-inset-cover/13523780.html, printed Feb. 2, 2012, 2 pages.

Oster 12-inch Skillet with Hinged Lid, webpage, http://www.oster.com/ProductDetails.aspx?pid=1625, printed Feb. 7, 2012, 1 page.

Application and File History for U.S. Appl. No. 29/647,961, filed May 17, 2018. Inventors: Berge et al.

ASM NPL, published May 19, 2004, https://web.archive.org/web/20040519225158/http://asm.matweb.com/search/SpecificMaterial.asp?bassnum=ma606116 (Year: 2004).

BBQ Branding Iron web printout, printed Nov. 18, 2016, 1 page.

NFL Single BBQ Brander by Pangea Brands web printout, printed Nov. 18, 2016, 5 pages.

2-Slice NFL ProToast MVP Toaster by Pangea Brands web printout, printed Nov. 18, 2016, 4 pages.

(56) References Cited

OTHER PUBLICATIONS

NFL Sandwich Press by Pangea Brands web printout, printed Nov. 18, 2016, 4 pages.
NFL Sandwich Press, web printout, printed Nov. 18, 2016, 2 pages.

* cited by examiner

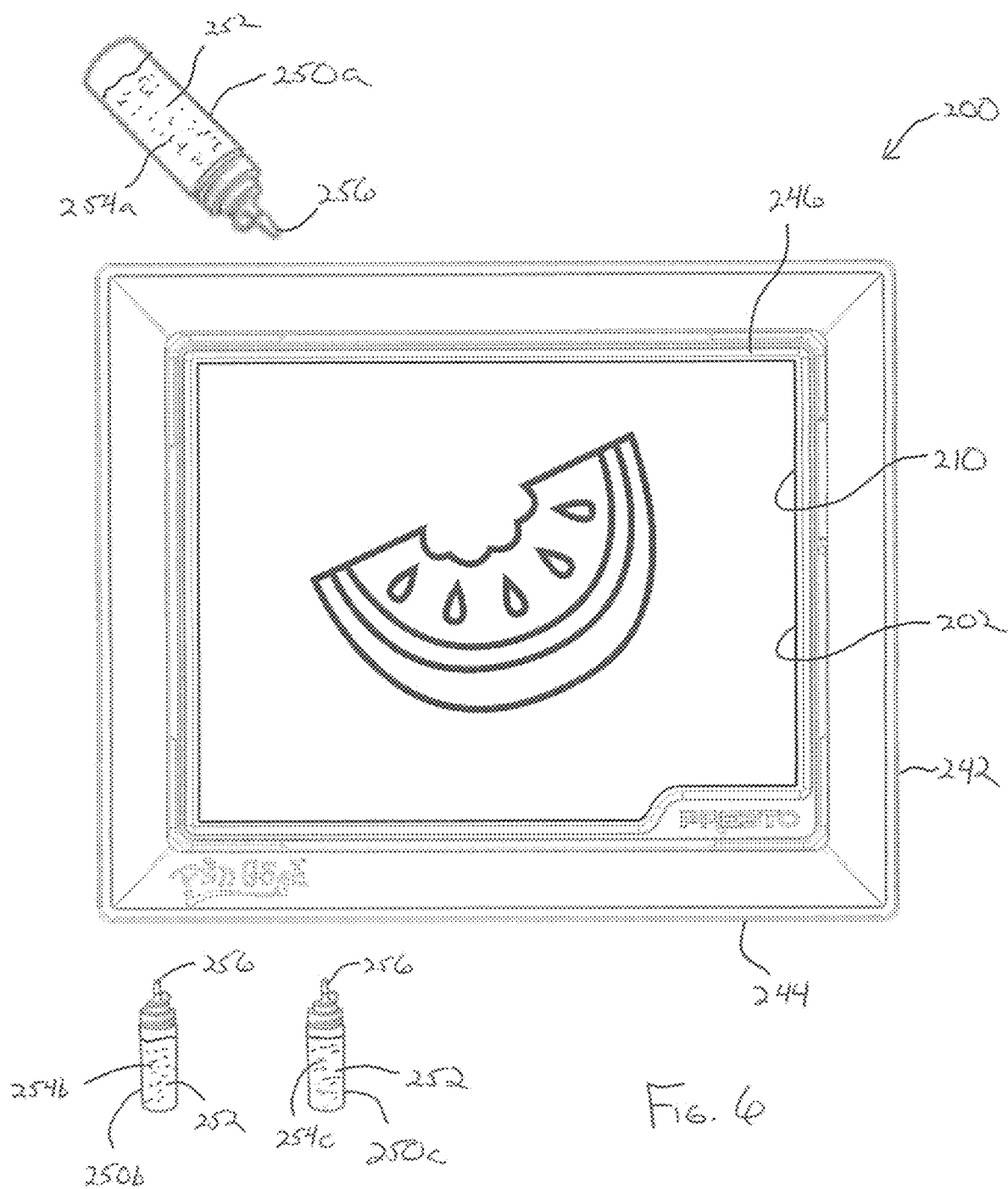

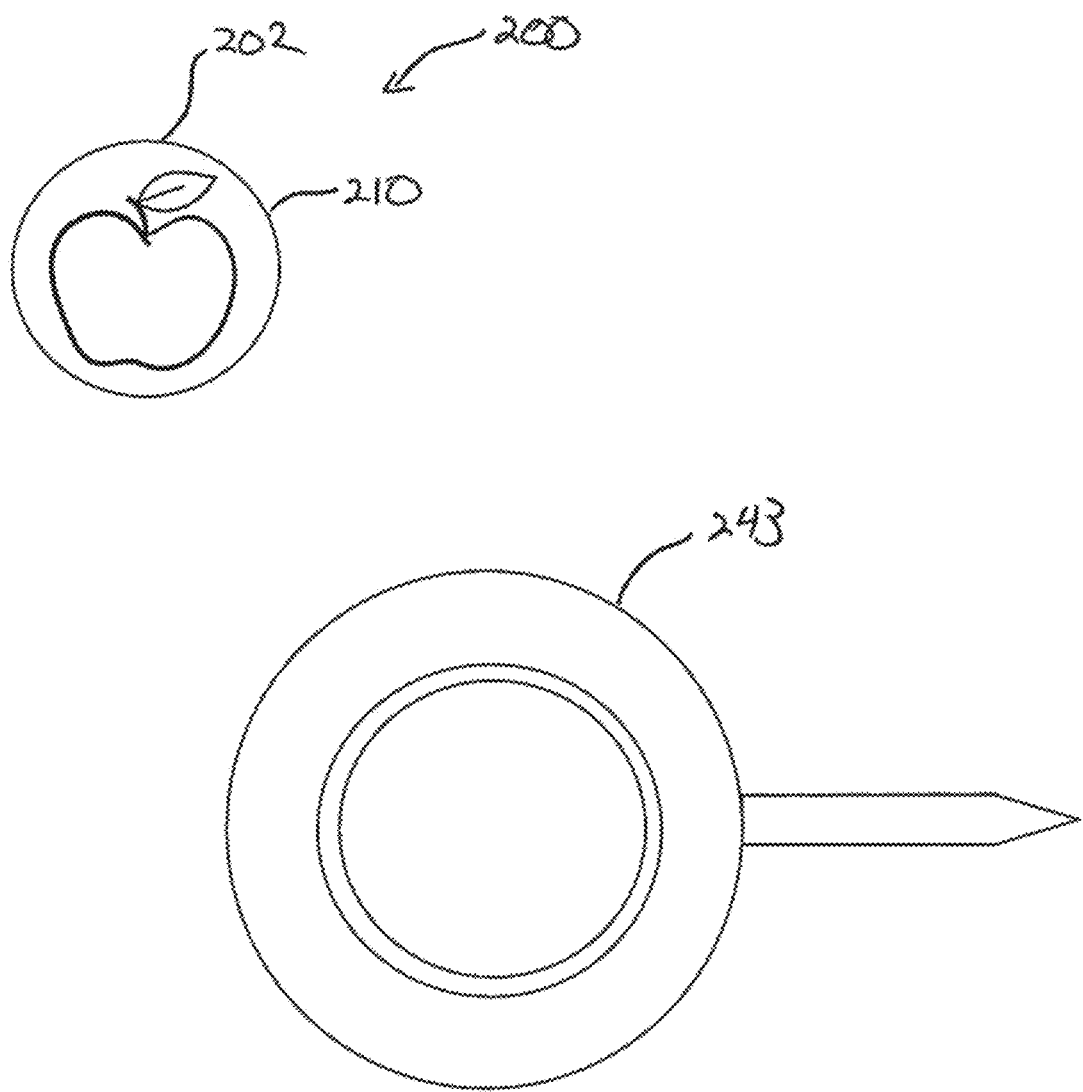

PANCAKE TEMPLATE AND RELATED PANCAKE COOKING METHOD

TECHNICAL FIELD

The present invention relates generally to countertop appliances. More specifically, the present invention is directed to reusable food templates for countertop appliances that include an etched image that serves as a guide for batters cooked on the countertop appliance.

BACKGROUND

Countertop appliances, for example, griddles have been used for many years to prepare pancakes. Generally, a pancake batter is poured onto a heated cooking surface of the griddle, whereby a first side is cooked and then the now solidified and partially cooked pancake batter is flipped to cook a second side. Often times the pancake batter is essentially poured in a single location that results in a pancake having a generally circular or round shape. Alternatively, a user may attempt to pour the pancake batter to form in a pattern such that the pancake ultimately has a desired shape when cooked. This can be difficult due to the propensity of the pancake batter to "run" or "spread" when initially poured onto the heated cooking surface.

In a variation to these attempts to form patterns or other shapes when cooking pancakes, pans have been created that include permanent templates formed on a cooking surface of the pan. Not only do these batter template pans provide a guide for forming a shape, but they also provide a user a guide for using multiple pancake batters having different colors to create an even more customized pancake appearance. Typically, these pancake batters can include food coloring to provide desired appearance and can be formulated to have a more viscous batter such that the propensity for the pancake batter to run is reduced. An example of a representative batter template pan 100 of the prior art is shown in FIG. 1 and is sold commercially under the Tefal® brand. Following use of the batter template pan, the batter template pan can be washed and stored for future use.

While the prior art batter template pan provides a mechanism by which users can create custom pancakes, an inherent drawback of the prior art is that the batter template pan includes only a single template. Thus, any desired appearance change by a consumer requires an additional batter template pan to be purchased which is not only expensive but can take up valuable storage space.

As such, it would be advantageous to improve upon the batter template pan of the prior art in ways that do not add significant cost or require significant storage space.

SUMMARY

A batter template system of the present invention provides easy interchangeability of template designs on countertop griddles, stove top pans, or any other appliance used to heat and cook food. The batter template system can comprise a plurality of template mats made from flexible, non-stick materials that are suitable for use with food and can accommodate conventional cooking temperatures. In a representative embodiment, each template mat can include an etched design on a non-stick sheet that is sized and shaped to fit onto a cooking surface of a countertop griddle. Alternatively, the non-stick sheet can be sized and shaped to fit into various sizes of commercially available pans or can even be individually cut onsite by a consumer for use with specific pans or appliances that the consumer already owns. In one presently preferred embodiment, the non-stick sheet can comprise a polytetrafluoroethylene ("PTFE") sheet that is both non-stick and compatible with conventional cooking temperatures experienced when cooking pancakes. In some embodiments, the non-stick sheet is compatible with conventional kitchen cleaning techniques include residential dishwashers. In some embodiments, the batter template system can include a countertop griddle that includes a cooking surface that is matched to an overall size and shape of the non-stick sheet such that the non-stick sheet is essentially retained on the cooking surface.

In one representative aspect of the present invention, a template mat is used by placing the template mat on a countertop griddle prior to or at the time of heating the cooking surface. In a preferred embodiment, the template mat can be configured to substantially conform or match a perimeter of the cooking surface such that the mat is retained, for example, by a lip defined around a perimeter of the cooking surface of the countertop griddle. Positioning the template mat within a boundary defined by the lip of the countertop griddle helps to secure the template mat to the cooking surface and promotes contact of the template mat with the cooking surface for heat transfer. When the template mat, in contact with the cooking surface, has reached a temperature suitable for cooking pancakes, one or more batters can be poured, squeezed or otherwise traced onto template lines on the template mat to reproduce an image etched on the template mat. When two or more batters are applied, each batter can have different visual characteristics, for example, color and can be sequentially applied to reproduce the image. After the batter has been substantially cooked on a first side and the liquid batter has solidified to form a pancake resembling the image, the template mat including the solidified pancake can be flipped over such that an uncooked second side of the solidified pancake is placed into contact with the cooking surface and the template mat is residing on top of the solidified pancake. At this point, the template mat can be peeled off the solidified pancake and set aside for further use or cleaning by hand or dishwasher. In some alternative embodiments, the solidified pancake can be removed from the template mat using a spatula or similar kitchen tool prior to flipping the solidified pancake, whereby the template mat can be removed from the cooking surface and the solidified pancake can be flipped such that the second side is placed directly into contact with the cooking surface.

In another aspect of the present invention, a batter template system can be utilized to cook pancakes having a customized appearance both in shape and coloration. The batter template system can comprise a plurality of template mats, with each individual mat having a different template image defined by template lines. Preferably, the template mats comprise a non-stick sheet such as, for example, a PTFE sheet in which the template image has been permanently etched. The template system can further comprise a countertop appliance, for example, a countertop griddle having a cooking surface that is sized and configured to receive and retain the template mat during use. In one embodiment, the cooking surface can be surrounded by a perimeter lip, wherein the template mat is shaped and sized to fit precisely within the perimeter lip. Alternatively, the template mat can be formed in sizes and shapes that are commonly found in commercially available cooking pans and countertop appliances such as griddles and skillets. The template mat can further be configured for cutting by a user so as to fit within a desired cooking pan or appliance or event directly to a stovetop such as, for example, a glass or ceramic induction cook top. In another aspect, the template system can comprise two or more batter applicators such that batters having different visual characteristics or colors can be sequentially applied on top of the template image.

The above summary is not intended to describe each illustrated embodiment or every implementation of the invention. Rather, the embodiments are chosen and described so that other skilled in the art can appreciate and understand the principles and practices of the invention. The figures and the detailed description that follow more particularly exemplify these embodiments.

BRIEF DESCRIPTION OF THE DRAWINGS

Subject matter hereof may be more completely understood in consideration of the following detailed description of various embodiments in connection with the accompanying figures, in which:

FIG. 6 is a top view of a batter template system according to another embodiment of the present invention.

FIG. 7 is a top view of a batter template system according to another embodiment of the present invention.

Figure 1:
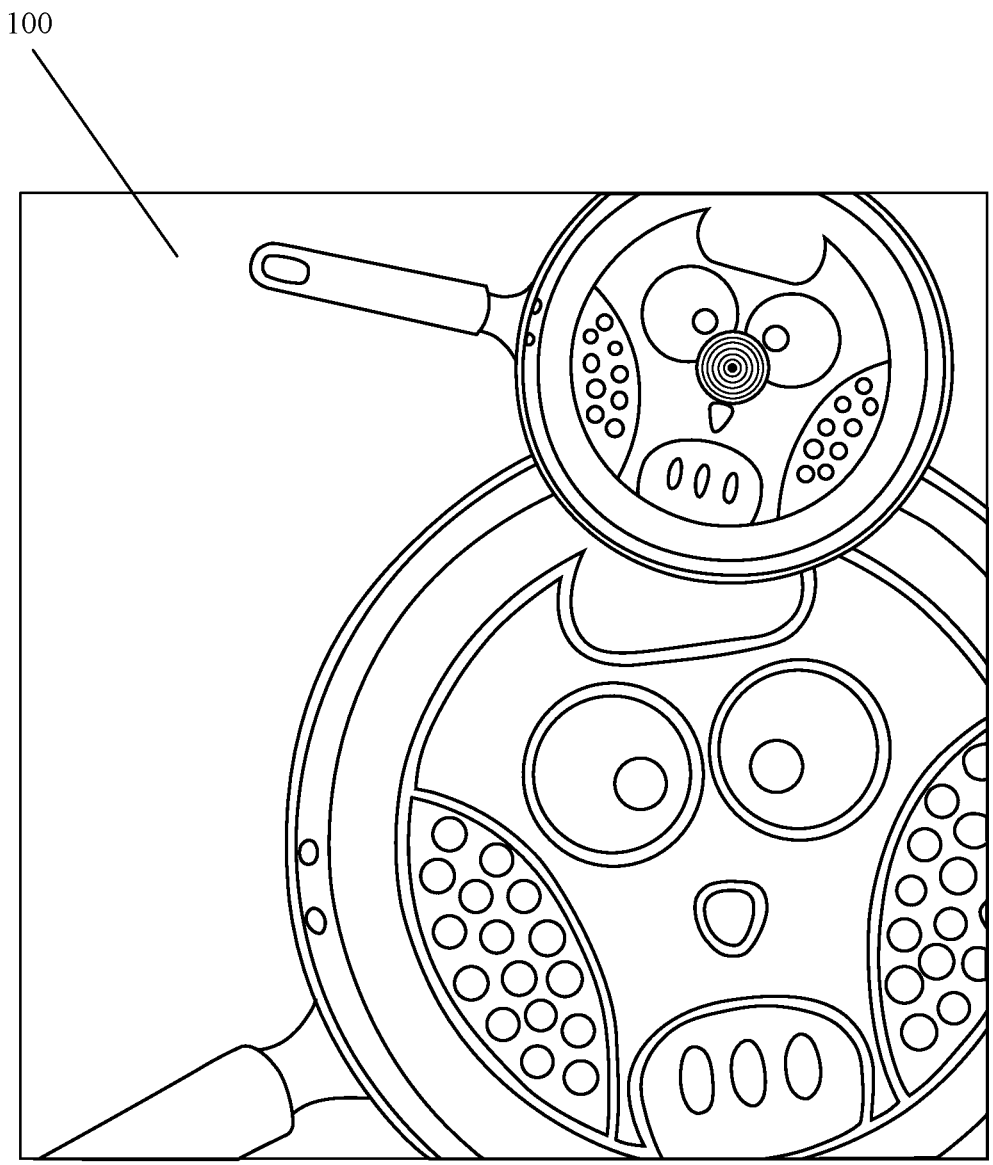
FIG. 1 is a perspective view of a frying pan of the prior art.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIGS. 2, 4, 4A and 4B, a batter template system 200 according to an embodiment of the present invention can comprise one or more individual template mats 202. Each template mat 202 can comprise a non-stick sheet 204 having a first side 206, a second side 208 and an external perimeter 210. External perimeter 210 can comprise a variety of shapes including, for example, a square as seen in FIGS. 2, 3, 4A, 4B and 5, circular as seen in FIG. 7, rectangular or generally rectangular as seen in FIG. 6 or other appropriate shapes and geometric combinations thereof. Non-stick sheet 204 can comprise a flexible, sheet formed of materials suitable for food contact and are compatible with conventional residential dishwashing techniques. In one representative embodiment, non-stick sheet 204 can comprise a PTFE sheet or a sheet having a layer of PTFE on each first and second side 206, 208. In a preferred embodiment, non-stick sheet 204 is preferably non-perforated to facilitate handling, cleaning and re-use of the template mat 202. Non-stick sheet 204 preferably has heat transfer and conduction properties that allow for rapid heating of the template mat 202.

Figure 2:
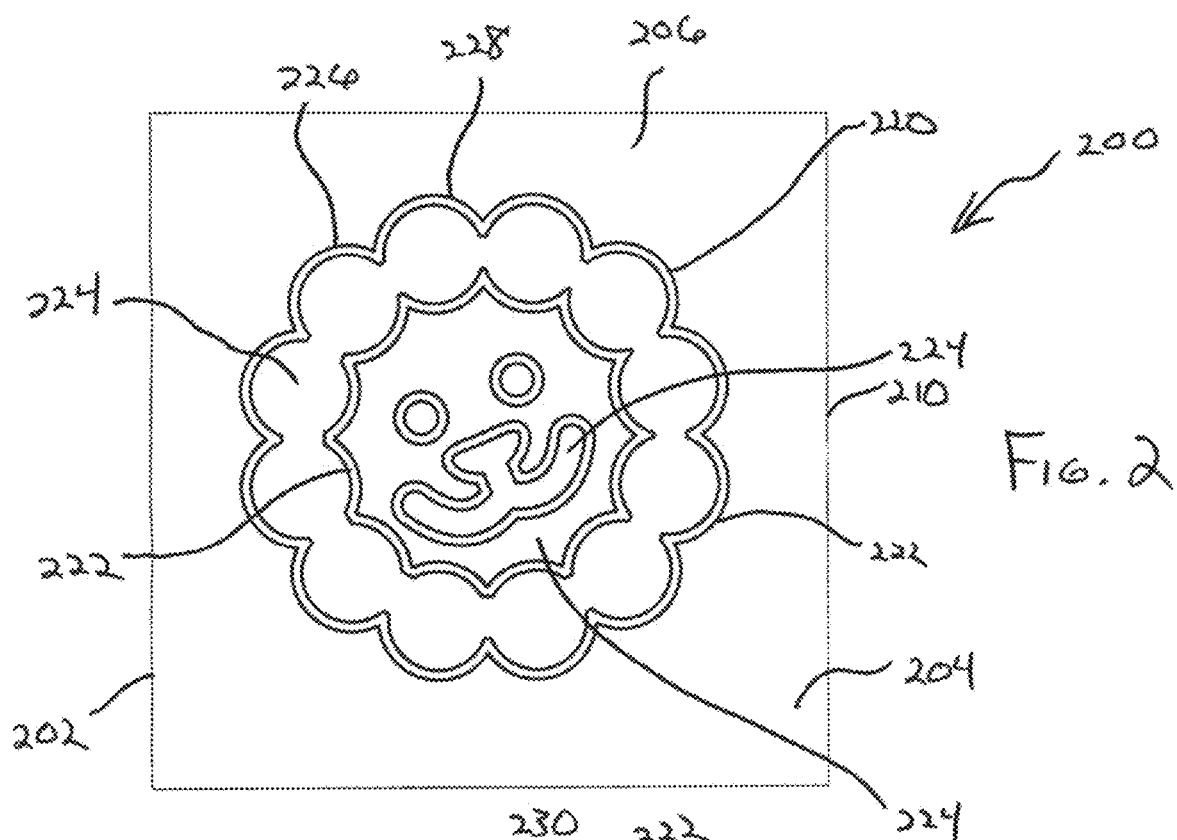
FIG. 2 is a top view of a batter template system according to an embodiment of the present invention.
Figure 3:
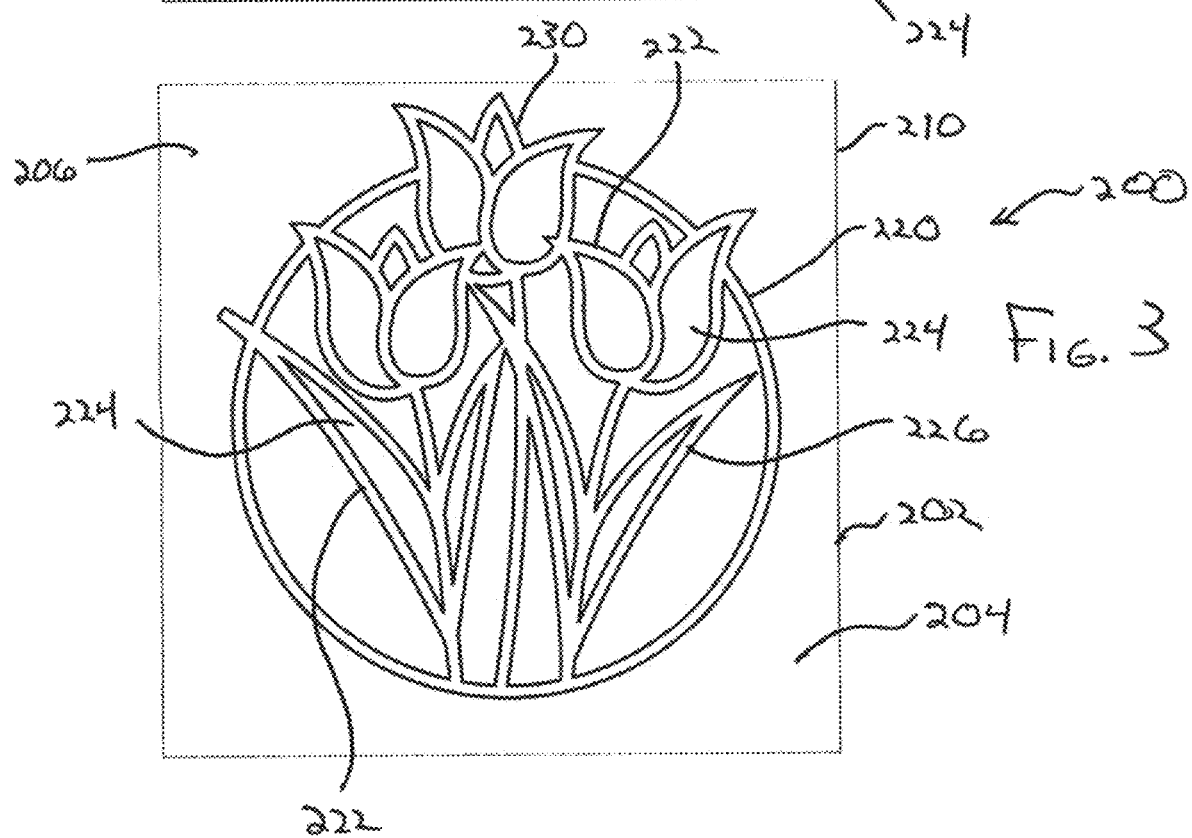
FIG. 3 is a top view of a batter template system according to another embodiment of the present invention.
Figure 4A:
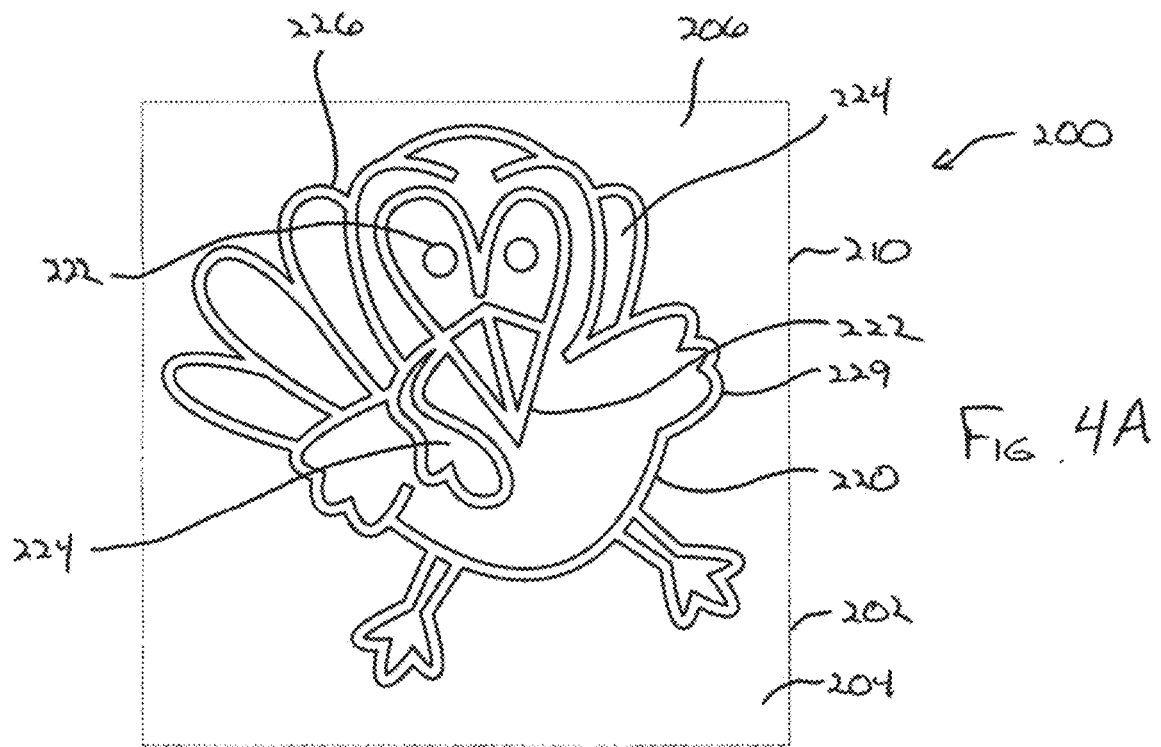
FIG. 4A is a top view of a first side of a batter template system according to another embodiment of the present invention.
Figure 4B:
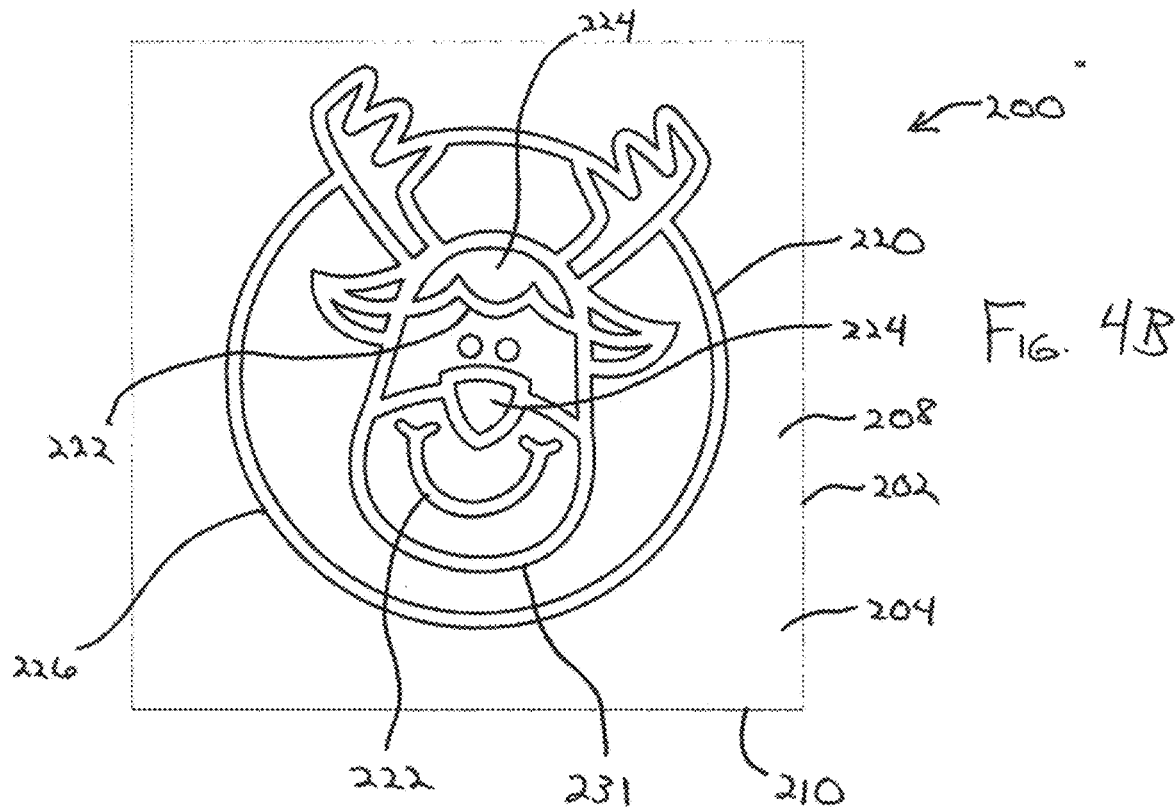
FIG. 4B is a top view of a second side of the batter template system of FIG. 4A.

As seen in FIGS. 2 and 3, each template mat 202 can include a pattern 220 permanently formed on the first side 206. Pattern 220 generally is defined by one or more lines 222 that define regions 224 that in combination produce a visual element 226. In a preferred embodiment, pattern 220, and more specifically, lines 222 are permanently, laser etched into the non-stick sheet 204 such that lines 222 are visually distinguishable from the non-stick sheet 204 and are permanently defined. For example, the visual element 226 on template mat 202 defines a lion 228 in FIG. 2 while the visual element 226 of a second template mat 202 defines a group of flowers 230 in FIG. 3. Batter template system 200 can comprise a plurality of individual template mats 202 to provide many different visual elements 226. For example, template system 200 can be sold in theme packs of individual template mats 202 for example, animals, cartoon characters, holiday and seasonal symbols and the like. Alternatively, and as shown in FIGS. 4A and 4B, template mat 202 can include different visual elements 226 on the first side 206 and the second side 208. For example, first side 206 can include a turkey 229 while the second side 208 includes a reindeer 231. By including visual elements 226 on both the first side 206 and the second side 208, the number of potential visual elements 226 can be doubled as compared to only having the visual element 226 on the first side 206 and the number of non-stick sheets 204 needed to display all of the patterns 220 is reduced.

Figure 5:
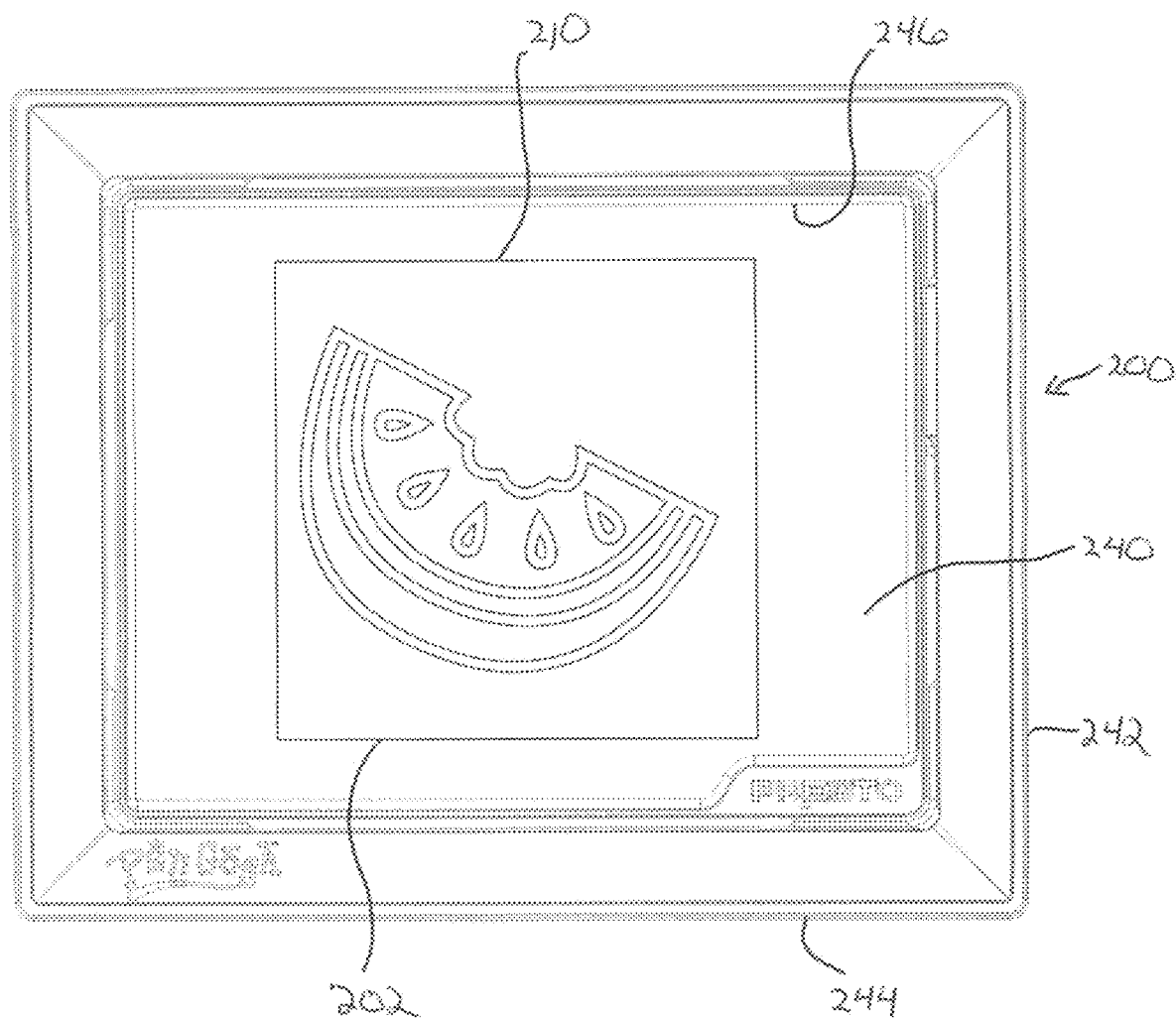
FIG. 5 is a top view of a batter template system according to another embodiment of the present invention.

With reference to FIG. 5, the batter template system 200 can further comprise a cooking surface 240. Cooking surface 240 can be found on a countertop appliance 242, for example, a countertop griddle 244 as shown in FIG. 5 or a countertop skillet. Alternatively, the cooking surface 240 can be part of a traditional frying pan or even on a range having a ceramic or glass-top induction cooking surface. As shown in FIG. 5, countertop appliance 242 can include a raised lip 246 that surrounds the perimeter of the cooking surface 240. The template mat 202 can be sized and shaped to fit on the cooking surface of a variety of commercially available countertop appliances 242. Alternatively, the template mat 202 can be specifically sized and shaped such that the external perimeter 210 of the template mat 202 fits precisely within and is retained by the raised lip 246 as shown in FIG. 6 and as disclosed in U.S. patent application Ser. No. 16/043,648 filed Jul. 24, 2018, which is hereby incorporated by reference in its entirety. Alternatively, the template mat 202 can be capable of being cut by a user to form a custom perimeter that fits the cooking surface 240 that is being used, for example, a frying pan 243 as shown in FIG. 7.

With reference to FIG. 6, the batter template system 200 can further comprise two or more batter applicators 250a, 250b, 250c. Generally, each batter applicator 250a, 250b, 250c defines an internal reservoir 252 capable of receiving a corresponding batter 254a, 254b, 254c. Each batter applicator 250a, 250b, 250c can further comprise an applicator tip 256 by which a user can direct the application of batters 254a, 254b, 254c to trace lines 222 or fill regions 224 of pattern 220 so as to ultimately define the visual element 226. Batters 254a, 254b, 254c can be formulated to include visual differences, for example, differing colors through the use of food coloring, such that the visual element 226 is formed with multiple colors. In some embodiments, the batter template system 200 can comprise two or more applicator tips 256 having different tip openings, sized either larger or smaller, for filling larger regions, tracing fine lines or creating fine details.

In use, a user will typically begin heating the cooking surface 240 to a suitable temperature for cooking pancakes. Template mat 202 can be placed onto the cooking surface 240 with the desired pattern 220 facing upwards and being visible to the user and with the opposed side residing against the cooking surface 240. In embodiments where the template mat 202 is precisely sized and shaped to reside within and to be retained by the raised lip 246, the user can precisely position the template mat 202 on the cooking surface 240. When the template mat 202 reaches the desired cooking temperature, the user can begin applying batter 254a, for example using batter applicator 250a, to trace the lines 222 and/or fill the regions 224 of the pattern 220. In a preferred method, lines 222 can be traced prior to filling regions 224 such that as the batter 254a begins cooking on the lines 222, the lines 222 define a solid boundary for retaining batter applied to the regions 224. After applying batter 254a, the user can then sequentially apply batters 254b, 254c to trace remaining lines 222 or fill any remaining regions 224. While this sequential application of batters 254a, 254b, 254c is described for three different batters, it will be understood that the batter template system and the described method can be used with any number of batters including one or two batters or more than three batters having visual differences to ultimately define the visual element 226.

With the visual element 226 defined by the user, the bottom portion of batters 254a, 254b, 254c that are in contact with the template mat 202 will begin to cook and form a solid pancake. Once the bottom portion of the batters 254a, 254b, 254c has cooked, the user can lift the entire template mat 202 and flip it over to place the uncooked side of the solid pancake into direct contact with the cooking surface 240. At this point, the user can peel the template mat 202 from the solid pancake and allow the solid pancake to cook to completion. Alternatively, and instead of flipping the entire template mat 202, the user can utilize a spatula or similar kitchen tool to lift the solid pancake from the template mat 202, whereby the template mat 202 can either be removed from the cooking surface 240 and the cooked pancake flipped directly on to the cooking surface or alternatively, the template mat 202 can remain on the cooking surface 240 and the cooked pancake flipped onto the template mat 202s to cook the opposed, uncooked side. Once the pancake is cooked on both sides, the template mat 202 can be cleaned using conventional residential dishwashing techniques including hand washing or using a dishwasher. Template mat 202 can then be stored and reused as desired.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A pancake template system, comprising:
a cooking surface;
at least one template mat formed of a flexible sheet, the template mat defining a first side including a first pattern permanently formed from recessed etched lines in the first side, wherein a second side opposite of the first side of the template mat is adapted for placement in contact with the cooking surface whereby at least one batter can be applied along the etched lines of the pattern formed in the first side to define a visual element, the first side of the template mat being shaped such that the template mat can be repositioned such that the first side is facing the cooking surface with the at least one batter located therebetween and in direct contact with the cooking surface, the second side comprising a second pattern formed from recessed etched lines, the second pattern forms an image that is different than the first pattern, and wherein the template mat is adapted to allow application of the at least one batter on to a selected one of the first pattern or second pattern.

2. The pancake template system of claim 1, wherein the at least one template mat defines an external perimeter.

3. The pancake template system of claim 2, wherein the cooking surface is defined on a countertop appliance, said cooking surface being surrounded by a raised lip and wherein the external perimeter fits within the raised lip.

4. The pancake template system of claim 3, wherein the external perimeter is selected to precisely fit within the raised lip such that the template mat is retained on the cooking surface by said raised lip.

5. The pancake template system of claim 2, wherein template mat is adapted to be cut by a user to define the external perimeter such that the external perimeter fits a cooking pan of the user.

6. The pancake template system of claim 1, further comprising a plurality of template mats with each template mat having a unique visual element on the first side and the second side of the template mat.

7. The pancake template system of claim 6, wherein the unique visual elements are directed to a theme.

8. The pancake template system of claim 1, further comprising:
a countertop griddle, said cooking surface being defined on the countertop griddle.

9. The pancake template system of claim 1, further comprising:
at least one batter applicator defining a reservoir for containing a first batter, the at least one batter applicator including a dispensing tip for selectively applying the first batter to the pattern.

10. The pancake template system of claim 9, wherein the at least one batter applicator further includes a second dispensing tip having an opening size different form the dispensing tip.

11. The pancake template system of claim 9, further comprising:
two or more batter applicators, where each batter applicator is adapted to selectively apply a unique batter with each batter having a visual difference.

12. The pancake template system of claim 11, further comprising:
a countertop griddle, said cooking surface being defined on the countertop griddle.

13. A method of forming pancakes defining a visual element, comprising:
providing a cooking surface;
providing at least one template mat formed of a flexible, heat compatible material, said template mat having a first side including a first pattern defined by recessed lines, wherein said lines are permanently etched into the first side of the flexible, heat compatible material, the template mat having a second side opposite of the first side, the second side including a second pattern defined by lines, said second pattern being permanently etched into the second side of the flexible, heat compatible material and forming a different image than the first pattern, the template mat defining an external perimeter.

14. The method of claim 13, further comprising:
heating the cooking surface; and
placing the at least one template mat on a cooking surface such that the pattern is upwardly facing.

15. The method of claim 14, further comprising: applying at least one batter to the pattern.

16. The method of claim 15, wherein the step of applying the at least one batter further comprises:
applying a first batter along the lines defining the pattern; and
applying a second batter within one or more regions between the lines, whereby the first batter applied to the lines provide a boundary for retaining the second batter in the one or more regions.

17. The method of claim 15, further comprising:
cooking the at least one batter on the template mat, whereby the cooked batter retains the pattern.

18. The method of claim 17, further comprising:
flipping the template mat such that the cooked batter is placed in direct contact with the cooking surface.

* * * * *